United States Patent Office 3,203,518
Patented Aug. 31, 1965

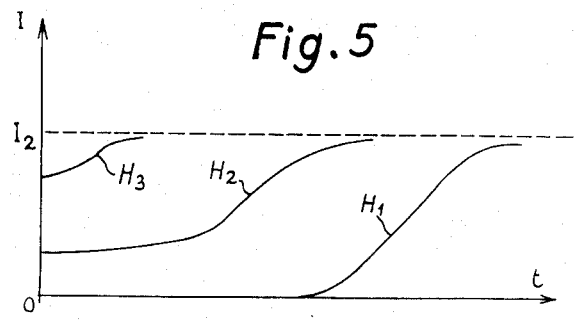
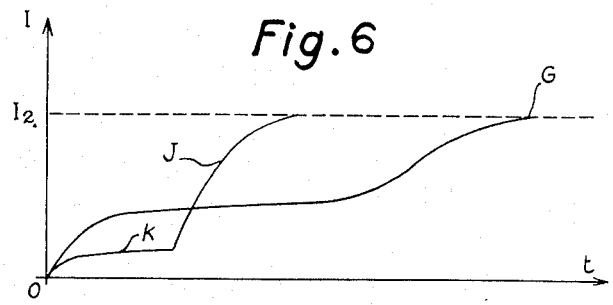
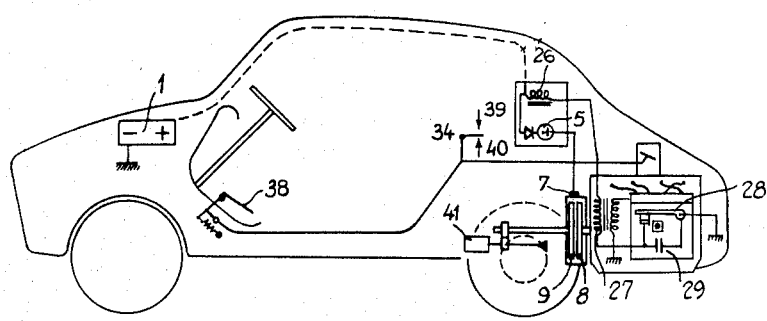

3,203,518
DEVICE FOR CONTROLLING ELECTRIC
CLUTCHES OF VEHICLES
Lucien Peras, Billancourt, France, assignor to Regie Nationale des Usines Renault, Billancourt, France
Filed Jan. 25, 1963, Ser. No. 253,900
Claims priority, application France, Feb. 2, 1962,
886,853, Patent 1,323,553
11 Claims. (Cl. 192—.052)

The present invention is concerned with devices for controlling the supply of electric current to electric clutches of engine-driven vehicles. It is already known, when starting a vehicle from rest or changing speed to use the dynamo of the vehicle for delivering a current increasing with the engine speed to the clutch winding, whereby a torque increasing gradually with the engine speed is transmitted. The search for the best possible starting characteristic leads to a considerable impairment of the dynamo charging characteristic which results in frequent failures especially in town driving.

Various attempts have been made with a view to energize the clutch winding from the storage battery of the vehicle through a transistor controlled by means of the engine ignition impulses, with a view to free the battery-charging electric machine or generator from the strain resulting from a direct energization of the clutch winding, but, so far as the applicant is aware, hitherto known propositions in this field provide either defective solutions or extremely complicated and therefore costly apparatus, however without solving all the transmission problems.

It is the object of this invention to provide a novel and economical industrial result by means of a device permitting a satisfactory and reliable operation of a control system of this character wherein a small number of semiconductors is used, this device being further applicable to any automatic or semi-automatic transmission. Although it incorporates only a reduced number of component elements, this device controls the clutch current according to the time-division method, thus eliminating the risk of transistor overheating characterizing this process. Moreover, the conduction time to total time ratio may equal 1:1, the loss of mean voltage being thus reduced to a minimum.

With this end in view, the present invention provides a device for gradually supplying current to an electric clutch of a vehicle as a function of the engine speed, without any lower speed limit, this device being characterized in that it comprises in series with the primary of the ignition coil a transformer of which the secondary charges through a diode, each time the contact breaker opens, a condenser connected across the emitter electrode and the base of a first transistor having its collector electrode (charged through a resistance) connected directly to the base of a power transistor of same polarity which energizes through its collector circuit the clutch winding, a power diode being disposed in the emitter circuit for blocking the device when the engine is stopped. A resistance connected to the base of the first transistor is also connected in series with the aforesaid condenser charged each time the contact breaker opens and with the voltage source. Each charging wave will block this first transistor to make the power transistor conductive, no power return circuit being provided from the second transistor to the first transistor. The maximum current in the clutch is obtained at the overlapping of the charging waves above a predetermined engine speed selected by a proper setting of the resistance or the condenser. At lower speed values the condenser discharge is limited between the charging waves by the low impedance of the base-emitter circuit of the first transistor.

The invention will now be described with reference to the accompanying drawings illustrating diagrammatically by way of example the manner in which the invention may be carried out in practice. In the drawings:

FIGURES 2 to 6 are explanatory diagrams in connection with the operation of the device of this invention; and FIGURE 7 illustrates theoretically the relative arrangement of the component elements of the device of this invention in an automobile.

Figure 1:
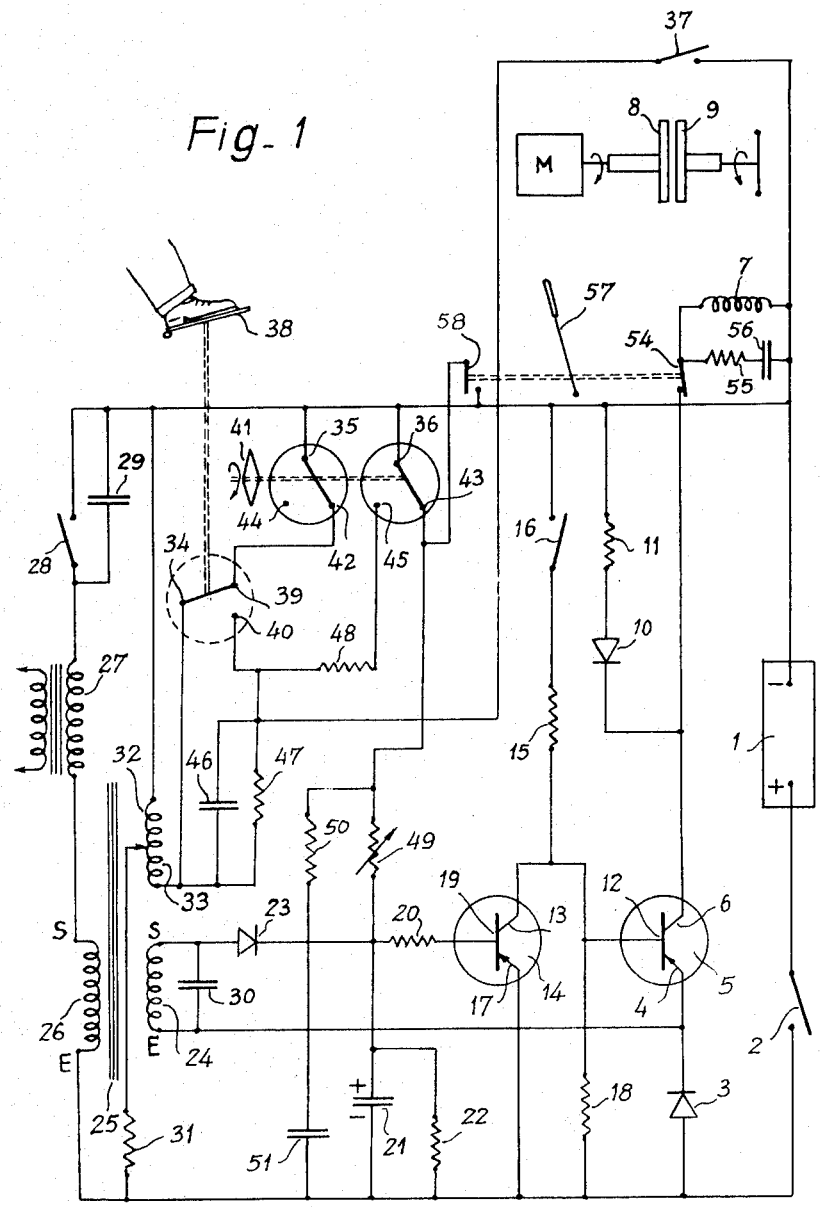
FIGURE 1 is a general wiring diagram of the electric circuit of a device constructed according to the teachings of this invention.

The device of this invention will now be described with reference to FIG. 1 of the drawings.

The positive terminal of a source of direct current 1, as a rule the storage battery of the vehicle is connected through the ignition key switch 2 and a junction diode 3 to the emitter electrode 4 of a power PNP transistor 5 having its collector electrode 6 connected to the negative terminal of the source of current through the switch 54 and the winding 7 of the electromagnetic clutch comprising a driving plate 8 and a driven plate 9 as shown in simplified form in the figure. A resistance 55 and a condenser 56, both of relatively low value, are connected in parallel to the winding 7. Between the collector 6 and the negative terminal of the source 1 are disposed in series a diode 10 and a resistance 11 of which the value will have the order of magnitude of the resistance of winding 7, for instance twice its value, the cathode of diode 10 being disposed on the side of the collector 6 of transistor 5. The base 12 of transistor 5 is connected on the one hand to the collector 13 of another PNP transistor 14 and on the other hand to the negative terminal of the source 1 through a limiting resistance 15 and a switch 16 open only when the gearbox or change-speed mechanism is in neutral, the emitter 17 of transistor 14 being connected through a return circuit to the positive terminal of the source 1 through the ignition key switch 2. A leakage resistance 18 is connected in parallel with base 12 to emitter 4 junction and diode 3.

The base 19 of transistor 14 is connected through a stabilizing resistance 20 of very low value to the positive plate of a condenser 21 having its negative plate connected to the emitter 17, a leakage resistance 22 being connected across the terminals of this condenser 21. This positive plate is also connected to the cathode of a diode 23 having its anode connected to the emitter 4 of transistor 5 through a transformer 25 of which the primary winding 26 made of relatively thick wire receives the primary current from the ignition coil 27 of the vehicle, the crankshaft-driven contact breaker being designated by the reference numeral 28 and its protection condenser by the reference numeral 29. Another condenser 30 is connected across the terminals of the thin wire winding 24. The input terminal of winding 26 is connected to the ignition key switch 2 and the input terminal of winding 24 is connected to the aforesaid emitter 4.

A resistance 31 connected to the positive terminal of source 1 through switch 2 supplies current to the common terminal of two auxiliary windings 32, 33 wound in the same direction one after another. The input terminal of winding 32 is connected to the negative terminal of the source of current 1 and the output of winding 33 may be connected selectively to various impedance windings through the set of contact or reversing-switch blades 34, 35, 36, 37. The blade 34 operatively connected to the accelerator pedal 38 engages a fixed contact 39 in the released or idling position of this pedal, and another contact 40 when the pedal 38 is depressed appreciably. The other blades 35 and 36 are controlled through a known device 41 responsive to the vehicle speed, connected to the output shaft of the gearbox or change-speed mechanism, this device being for instance a centrifugal device of known type. When the vehicle is still or driven at low speed, for example up to 10 m.p.h., the blades 35 and 36 engage the fixed contacts 42 and 43 respectively, and at higher vehicle speeds they engage contacts 44 and 45 respectively. The contact 37 responsive through mechanical friction means or if desired magnetic means to the direction of relative rotation of the clutch plates 8, 9, connects—when the velocity of the driven shaft 9 exceeds the velocity of the normally driving shaft 8—the negative terminal of source 1 to the output terminal of winding 33 through a condenser 46 shunted through a resistance 47.

From a terminal common to contact 37 and to the parallel elements 46, 47 two connections are established which lead the one directly to contact 40 and the other through a resistance 48 of average value to the contact 45. Contact 43, engaged at low vehicle speed by the blade 36, is connected on the one hand through an adjustable resistance 49 to the positive plate of condenser 21 and on the other hand to the emitter 17 through a high-value unbiased condenser 51 in series with a very low limiting resistance 50.

The gear-change control lever 57 actuates simultaneously the switch 54 connected in series with the winding 7 and the contactor 58 connected in parallel to the contact 36–43 responsive to the vehicle speed. During gear changes, contact 54 is open and contact 58 closed, and, after each change, contact 54 is closed and contact 58 open.

The operation of the system will now be described with reference to the current or voltage oscillograms read at different points of the mounting shown in FIG. 1 and illustrated in FIG. 2 at 2a, 2b, 2c, 2d, 2e, 2f, 2g as a function of time.

Assuming that the engine of the vehicle is stopped, with contacts 2, 16, 54, 36–43 closed, the position of contacts 28, 34 and 37 being immaterial, no current variation takes place in winding 26, no voltage is induced in the secondary 24 and therefore no rectified voltage appears in the condenser 21. The base 19 to emitter 17 junction of transistor 14 being strongly biased by the current circulating through resistances 49 and 20, transistor 14 is conductive. Resistance 20 prevents the high-frequency oscillation of transistor 14. The value of resistance 49 is selected with a view to cause a strong collector current to flow and thus, through a voltage drop in resistance 15, reduce the collector 13 to emitter 17 voltage to a very low value, with a considerable safety margin. This voltage between 13 and 17 is quite below the value necessary for biasing the base 12 to emitter 4 junctions of transistor 5 and of diode 3 which are disposed in series. Transistor 5 is blocked and no current flows through the clutch winding 7.

Assuming that the change-speed mechanism is in neutral, the opening of contact 16 leads to the same result irrespective of the conditions of transistor 14, resistance 18 maintaining the base 12 of transistor 5 at the positive voltage of source 1, more positive than the voltage of emitter 4.

When the engine revolves, the current passing through the contact breaker 28 is broken at regular time intervals. The current flowing through the winding 26, which is the same as that flowing through the primary winding of ignition coil 27, has the pattern shown at 2a in FIG. 2. At F contact 28 is closed and the current appears gradually and disappears when the contact is broken at R with oscillations. The secondary 32–33 is the seat of considerable induced voltages if the output terminal of the auxiliary winding 33 is not connected through the set of contacts or reversing switches 34, 35, 36, 37 to weakening impedances. This is observed notably when starting the vehicle from rest (with one gear engaged and the accelerator pedal depressed). In fact, as the speed is low, the blades 35 and 36 engage the contacts 42 and 43 respectively, and the blade 34 engage contact 40 while contact 37 remains open, thus isolating the output terminal of winding 33. Under these conditions, the oscillogram of the voltage produced across the terminals of secondary 24 has the pattern shown at 2b in FIG. 2. The current breaks, detected only by the diode 23, charge the condenser 21 according to the curve pattern 2c, the break oscillations being prolonged on the one hand by the action of condenser 30 and on the other hand by the application of Lenz' law, due to the action of resistance 31 in series with the source of current 1 and winding 32. As the continuous flux passing through this winding is in opposition with the flux in winding 26, it permits of placing the magnetic circuit in the condition of maximum efficiency for transmitting the alternating component on the charging voltage of condenser 21, and, more particularly, of minimizing the influence of ohmic resistance variations in the ignition coil as a function of engine heating.

As the blade 36 engages the contact 43, due to the low velocity of the vehicle, the resistance 49 discharges condenser 21 inasmuch rapidly as the charging voltage of condenser 21 is completed by the voltage from source 1.

When this discharge reverses the voltage of condenser 21, the junction 19–17 of transistor 14 becomes conductive and prevents the discharge from proceeding further. Having thus limited the exponential of the discharge, this exponential merges, at a change of direction of the curve, into the horizontal portion thereof 2c, due to the junction 19–17 becoming operative. This change of direction permits of building without difficulty, in the transistor amplifier, particularly steep switching sides.

The resistance 22 discharges also condenser 21, but since its value is relatively high and since this resistance is responsive to the voltage of condenser 21 alone, its effect is only of secondary importance, as will be explained presently.

Each time the contact breaker 28 opens the ignition circuit the base 19 to emitter 17 junction of the PNP transistor 14 is rendered non-conductive by the delivery of positive voltage which is visible in diagram section 2c, no current flowing through the collector electrode 13. As switch 16 is closed, the potential of collector 13 would attain the value of the potential of the negative terminal of source 1 were it not for the presence of the base 12 to emitter 4 junction of transistor 5 and of the diode 3 which are rendered conductive and limit the potential variation. The curve 2d of FIG. 2 illustrates the potential of collector 13 in relation to the emitter 17, transistor 14 being conductive in the shaded portion of the diagram, outside the current delivery periods.

When the base 12 to emitter 4 junction is conductive, current flows through the circuit of collector 6, switch 54 being closed. The base resistance 15 is selected to bring under these conditions the voltage of collector 6 to the saturation potential shown by the shaded portions of diagram section 2e illustrating the evolution of the potential between the collector 6 and the positive terminal of source 1.

Each time the contact breaker 28 opens the ignition circuit the current of collector 6 shown in diagram section 2f rises gradually according to a law determined by the $L/R$ ratio of winding 7 and stops suddenly when condenser 21 is discharged. Since transistor 5 is no more conductive, the current through winding 7 will nevertheless continue to flow in the same direction due to the resistance 11 and diode 10 energized in the conductive direction, the winding 7 acting now as a generator. As the $L/R$ ratio is lower than before, the current decreases more rapidly in the winding than it rose during the conductive period of transistor 5. The last diagram section 2g of FIG. 2 illustrates the current evolution in winding 7, the voltage peaks between collector 6 and the positive terminal of source 1 when the current is broken in transistor 5 being on the other hand visible in diagram section 2e.

Figure 2:
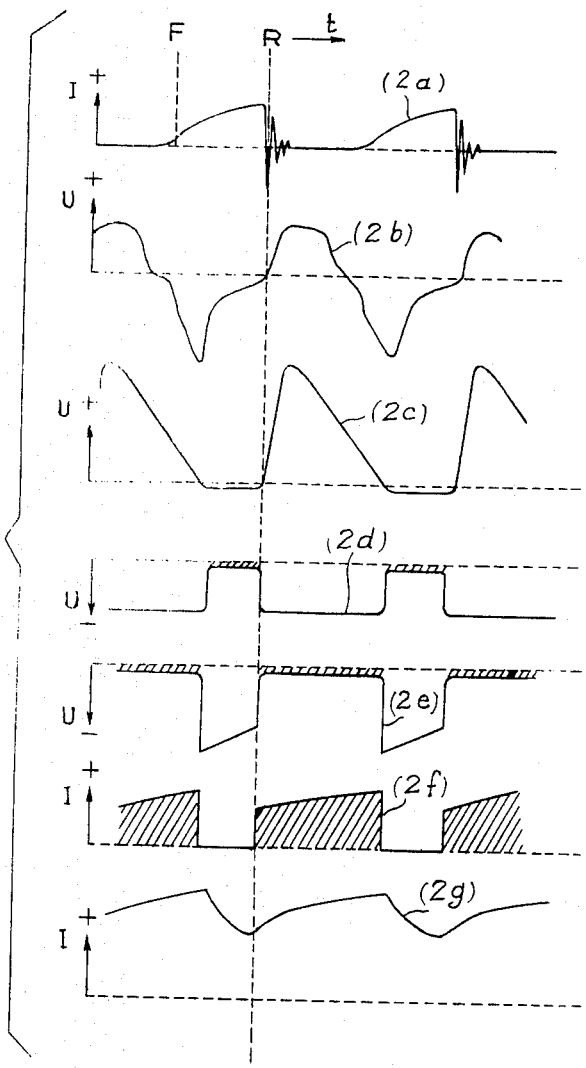
Figure 3:
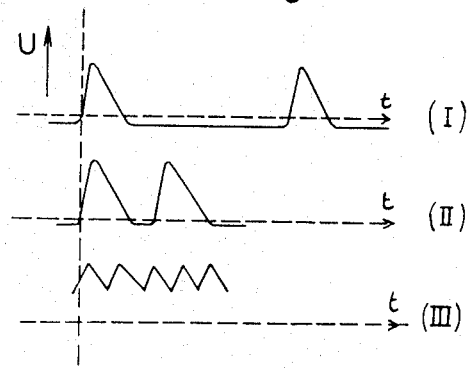
Figure 4:
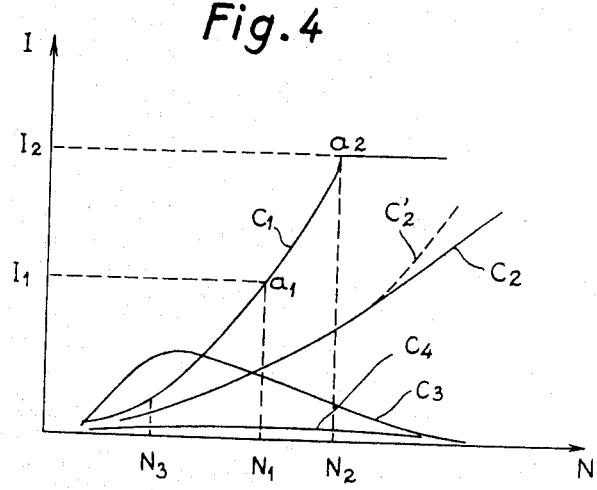

Since the impulses of positive charging voltage from condenser 21, which are shown in diagrammatic form at 2c in FIG. 2 and transposed in FIG. 3 for different engine speeds I to III of gradually increasing value, have an approximately constant duration and are proportional in number to the velocity of rotation of the engine, the ratio of the time period during which transistor 5 is conducting to the total time will increase with the velocity of rotation. The mean current in winding 7 will not be proportional to the velocity of rotation, due to the presence of resistance 11 in the winding recovery circuit, during the non-conducting periods of transistor 5. As the time constant during the discharge is reduced by this resistance, there is enough time for the current flowing through the winding, at low engine speeds, to be cancelled substantially between two conductive periods of transistor 5, whence a reduction in the mean current. The use of a lower time constant during the charging period than during the discharging period may be considered as a known expedient. When the speed increases the frequency of the current deliveries illustrated in FIG. 3 and when there is not sufficient time for the current in the clutch to be cancelled between two consecutive conductive periods of transistor 5; therefore the mean current increases more rapidly than the conductive time to total time ratio. At high engine speeds the discharges from condenser 21 are not completed when new charges appear. Its voltage assumes the pattern shown at III in FIG. 3, and transistor 14 is blocked permanently, thus causing the power transistor 5 to be constantly conductive. The current flowing through winding 7 attains its maximum value limited by the ohmic drop and the waste voltages in transistor 5 and diode 3. The current flowing through the winding 7 as a function of the engine speed has the pattern of curve $C_1$, FIG. 4.

The engine speed $N_2$ at which the maximum current $I_2$ attained at $a_2$ can be adjusted without difficulty by means of a resistance 49 and the concavity or sag of the curve can be set independently of the preceding adjustment by varying the resistance 11. When the clutch is engaged as for starting, during a test with the vehicle stationary, the brakes applied and the accelerator depressed home, the engine revolves at a speed $N_1$ corresponding to a current $I_1$, at which speed the engine torque and the clutch reaction torque compensate each other at point $a_1$.

In practice, with the resistance 11 having a value of 1½ to 2 times the resistance value of winding 7, the resistance 49 will be adjusted at point $a_1$ to avoid dispersions.

To prevent the vehicle from creeping under standstill conditions (with the driver's foot removed from the accelerator pedal, the engine idling or with the choke on, and one gear engaged), the blade 34 connected to the accelerator pedal 38 provides a direct connection between the output terminal of winding 33 and the input terminal of winding 32 through the contact 39 and contacts 35–42 closed at low vehicle speeds. A considerable fraction of the alternating power delivered by the transformer 25 is thus taken by the short-circuited auxiliary windings 32 and 33, thus reducing strongly the amplitude of the current deliveries for charging the condenser 21 as well as the conducting time to total time ratio on transistor 5. The clutch engagement current characteristic obtained as a function of the engine speed under these conditions is that shown by curve $C_4$ of FIG. 4.

When, after starting, the vehicle attains a speed of the order of 10 m.p.h. (to be selected slightly below than the lowest gear-change velocity), the mechanism 41 moves the blades 35 and 36 for engagement with contacts 44 and 45, thus causing the following changes to take place:

Opening the contact 35–42, thus preventing the short-circuiting of windings 32 and 33, even in the uppermost accelerator pedal position (driver's foot removed therefrom), the $C_4$ characteristic being suppressed.

The current break 36–43 eliminates the return to the negative terminal of resistance 49 and therefore reduces the discharge of condenser 21 henceforth ensured by the resistance 22 alone, of which the influence is low relative to that of resistance 49. Condenser 51 extends the duration of the effect produced by contact 36–43 by discharging gradually and subsequently charging itself in the opposite direction under the influence of the charges of condenser 21. When the biasing of the base 19 of transistor 14 is no more sufficient the current in collector electrode 13 is reduced while the collector 13 to emitter 17 voltage increases. On the other hand, when the biasing of the base 12 to emitter 4 junction of transistor 5 is sufficient the current increases gradually in collector 6. When condenser 51 is discharged, the current flowing through the clutch winding 7 has attained its maximum value irrespective of the velocity of rotation of the engine.

During the transitory period following the opening of contact 36–43, the current flowing through the clutch winding is both subordinate to time and to the engine speed, since each delivery of charging current to condenser 21 assists in discharging condenser 51. As the opening of contact 36–43 is generally attended by the closing of contact 36–45, the windings 32 and 33, when the accelerator pedal is depressed, deliver current to the weakening resistance 48 whereby the engine-speed to clutch winding current characteristic becomes like the curve $C_2$ (FIG. 4), which is intermediate to $C_1$ and $C_4$.

Due to the action produced by the time parameter causing the current to rise gradually up to the maximum value, this characteristic is straightened and assumes the shape shown at $C'_2$ (FIG. 4), the initial point of this curve being taken on curve $C_2$, at a level depending on the engine speed. The aforesaid characteristic $C'_2$ is "softened" in comparison with the starting curve $C_1$.

By applying the timing and softening or easing device (under the control of a contact responsive to the vehicle speed at a velocity lower than the first gear change) it is possible on the one hand to make all gear changes with a "softened" characteristic, including the return to the lowest gear, and on the other hand the starting of the engine from the motion of translation of the vehicle, in case of starter failure or of accidental engine stalling. In fact, in case of lack of electric current charges on condenser 21, subsequent to the opening of contact 36–43, the resistance 22 is sufficient for setting the potential of base 19 to such a value that transistor 14 becomes conductive, after the discharge of condenser 51 in resistances 50, 49 and 22 and through the base 19 to emitter 17 junction. Under these conditions, the current in the clutch winding assumes gradually its maximum value after a time lag depending on the safety margin with which resistance 49 determines the saturation of transistor 14 during its conductive period.

FIG. 5 shows in diagrammatic form how the clutch winding current would vary as a function of time after the opening of contact 36–43 at engine speeds increasing from curve $H_1$ to curve $H_3$, curve $H_1$ corresponding to zero engine speed. It is assumed that the softening resistance 48 is of relatively high value.

During gear changes the clutch winding 7 should be deenergized very rapidly and the timing mechanism reset by recharging condenser 51. To this end, the gear change control lever 57 is coupled on the one hand to switch 54 opening the circuit of clutch winding 7 during the gear change and, on the other hand, to contact 58 recharging condenser 51 through the limiting resistance 50. When the gear change is completed, the opening of contact 58 and closing of contact 54 cause a current to flow through the clutch winding 7 which current is a function of the engine speed and also of time (as in the case of the opening of contact 36–43), the re-coupling of clutch plates 8 and 9 takes place very gradually. The smoothness of this clutch re-engagement is adjustable through the smoothing resistance 48 which may have a different value for each change-speed ratio in a manner not shown in FIG. 1 to simplify the drawing. Should the engine stall accidentally during a gear change, the timing device would restart the engine upon completion of its operation.

The return to a lower gear, which takes place with contact 37 closed (since the driven plate 9 revolves faster than the normally driving plate 8) takes place in two different manners, according as the accelerator pedal is raised or depressed.

In the first case, the coupling action must be both rapid and smooth, as the torque to be transmitted through the clutch is limited to one fraction of its maximum value. As the closing of contact 37 has connected across the terminals of windings 32 and 33 the condenser 46 shunted by resistance 47, the current/engine speed characteristic assumes the shape of curve $C_3$, which is the initial point of current intensity at the beginning of the timing period. This curve $C_3$ attains a maximum value in the region of the engine idling speed, or, still better, at a speed slightly superior thereto, and decreases at higher speeds, the energy taken by the condenser increasing with frequency. At low speeds a resonance effect and the extension of the condenser charging time afford a higher intensity than with the starting curve $C_1$. In the decreasing portion of the curve a state of equilibrium between the vehicle speed and the engine speed sets up and determines a temporary level in the current strength-time curve as shown at G in FIG. 6. At the end of the time lag period the current resumes its maximum value.

In the second case (that is, with the accelerator pedal depressed subsequent to the engagement of a lower gear) it is necessary as usual to allow the engine speed to rise up to the value corresponding to the vehicle speed. To obtain this result, the blade 34 engaging the contact 40 in the depressed accelerator pedal position will short circuit the condenser 46 shunted by resistance 47. The windings 32 and 33 are thus short-circuited through contact 37, the current strength/engine speed characteristic being that shown in FIG. 4 at $C_4$. The engine, moderately braked by the clutch, may pick up speed rapidly. When the speed of the normally driving plate 8 (i.e. the engine speed) becomes higher than the speed of the driven plate 9, contact 37 opens, thus restoring the characteristic $C_2$ of FIG. 4, contact 36-45 remaining closed. Due to the twofold action of engine speed and time lag, the current evolution as a function of time takes the shape of curve K (FIG. 6) during the closing of contact 37, then of curve J (FIG. 5) after the opening of this contact.

The above-described device operated with PNP-polarity transistors is also operable with NPN transistors, provided that the source polarities are reversed and the diodes and transformer are properly connected to the circuit.

FIG. 7 illustrates very diagrammatically the essential component elements of the clutch control device of this invention mounted on a rear-engined passenger vehicle. The clutch comprising the plates 8, 9 has its winding 7 energized from the source 1 through the transistor 5 responsive to the current impulses collected by the winding 26 in series with the ignition coil 27 and the contact breaker 28 of the ignition distributor. The accelerator pedal 38 actuates the blade 34 engaging contact 39 in its inoperative position and contact 40 in its depressed position. The speed responsive device 41 is driven from a shaft coupled to the drive wheels of the vehicle.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. An electric clutch with a control circuit therefor, said control circuit controlling said electric clutch in a motor vehicle as a function of motor speed, said control circuit comprising an ignition system including a direct current source, an ignition coil, a distributor, and breaker points, a power transistor, said power transistor controlling the output of said direct current source and being controlled by the ignition current impulses to the motor, a control transistor, a diode, a condenser, a transformer, the primary of said transformer being connected in series with the ignition coil and the secondary being connected across said condenser through said diode, said condenser being further connected between the emitter and base of said control transistor so as to be charged each time the breaker points open, a resistance one end of which is connected between said condenser and the base of said control transistor and the other end of which is connected to said direct current source, the collector of said control transistor being connected to a resistance and to the base of said power transistor, said power transistor energizing said electric clutch through the collector, a power diode being connected to the emitter of said power transistor for blocking said power transistor when the motor is not running, whereby polarities are so selected that each time the contact breaker opens the voltage of said current source is added through the resistance to the charging voltage of said condenser to provide a steep-sided wave of substantially constant duration, the value of said resistance being such that said control transistor becomes completely conductive between the charging waves whereaas it is blocked by the passage of each of said charging waves to make the power transistor conductive, the maximum current in the clutch winding being obtained when the charging waves overlap above a motor speed selected by setting the values of said resistance and said condenser, said condenser discharge being limited by the low impedance of the base to emitter circuit of said control transistor at lower motor speeds and between said charging waves.

2. A device for controlling electric clutches in motor vehicles according to claim 1 wherein the return from the condenser charging winding is passed to a common point between said power diode and the emitter of said power transistor, for adding the direct voltage thresholds of the two diodes in order to cause between the charging waves the passage of current from the resistance connected to the condenser and to the base of said control transistor only through the base to emitter junction of said control transistor.

3. A device for controlling electric clutches in motor vehicles according to claim 1 wherein a circuit-breaking means is connected to the source of current of said condenser discharge resistance, a clutch winding in said electric clutch, a second high value condenser being inserted permanently between the resistance return line and one of the terminals, said second condenser providing temporarily a current to said clutch winding, said current being subordinate to engine speed and time.

4. A device for controlling electric clutches in motor vehicles according to claim 1 wherein there is on said transformer at least one auxiliary winding in which a direct current is circulated to produce continuous ampere-turns opposite to those of the primary current, thereby imparting to said transformer the requisite efficiency and stability conditions for resisting current variations in the ignition coil as a consequence of overheating.

5. A device for controlling electric clutches in motor vehicles according to claim 1 wherein there is provided a transmission, a current compensator winding on said transformer formed by at least one auxiliary winding closed on different impedances for modifying according to transmission requirements, during gear changes.

6. A device for controlling electric clutches in motor vehicles according to claim 1 wherein at least two auxiliary windings are connected in series with the closing impedance for ensuring the best possible utilization of the winding volume and permit, due to the continuous component resulting from the current compensator winding, the use of voltage threshold impedances of known type, such as diodes.

7. A device for controlling electric clutches in motor vehicles according to claim 1, including an accelerator pedal, and wherein at low vehicle speed at least one of a plurality of contacts close the circuit of at least one auxiliary winding having a range of impedance from zero to very low impedance in order to obtain a minimum current in the clutch winding when the accelerator pedal is not depressed.

8. A device for controlling electric clutches in motor vehicles according to claim 1 wherein there is provided a gear-change control lever and a set of contacts responsive to the vehicle speed and to the displacement of said lever, in order to apply, when the clutch is recoupled, by connecting impedances on said auxiliary windings, a current to the clutch which is subordinate to the engine speed and also to time.

9. A device for controlling electric clutches in motor vehicles according to claim 1 wherein said clutch comprises driving and driven plates, a contact responsive to the relative direction of rotation of said driving and driven clutch plates, and closing when the speed of the normally driving plate connected to the engine is lower than that of the normally driven plate, closes the circuit of at least one auxiliary winding.

10. A device for controlling electric clutches in motor vehicles according to claim 1 wherein the closing impedance of at least one of said auxiliary windings is determined by a condenser shunted by a resistance connected to the output of said winding with a view to obtain a current strength characteristic in the clutch as a function of the variable engine speed alone, which characteristic decreases at high engine speed and has its maximum value slightly above the idling speed of the engine, whereby, on the one hand, when a lower gear is engaged with the accelerator pedal raised.

11. A device for controlling electric clutches in motor vehicles according to claim 1 wherein a contact closing when the accelerator pedal is depressed short circuits at least one of the auxiliary windings as long as said contact responsive to the relative direction of rotation of the clutch plates is also closed, in order, when the recoupling takes place through a lower gear ratio, with the accelerator depressed.

References Cited by the Examiner

UNITED STATES PATENTS

| 3,064,774 | 11/62 | Maurice | 192—.052 |
| 3,073,422 | 1/63 | Baumann | 192—.052 |
| 3,126,989 | 3/64 | Baumann | 192—3.5 |

DON A. WAITE, *Primary Examiner.*

DAVID J. WILLIAMOWSKY, *Examiner.*